US012614334B2

(12) United States Patent
Zhang et al.

(10) Patent No.:  US 12,614,334 B2
(45) Date of Patent:   Apr. 28, 2026

(54) INTELLIGENT MANAGEMENT OF APPLICATION LAYER RENDERING

(71) Applicant: QUALCOMM Incorporated, San Diego, CA (US)

(72) Inventors: Nan Zhang, Beijing (CN); Yongjun Xu, Beijing (CN); Wenkai Yao, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 243 days.

(21) Appl. No.: 18/042,575

(22) PCT Filed: Oct. 28, 2020

(86) PCT No.: PCT/CN2020/124252
§ 371 (c)(1),
(2) Date: Feb. 22, 2023

(87) PCT Pub. No.: WO2022/087871
PCT Pub. Date: May 5, 2022

(65) Prior Publication Data
US 2023/0334746 A1      Oct. 19, 2023

(51) Int. Cl.
*G06T 15/00*        (2011.01)
*G06F 9/451*        (2018.01)

(52) U.S. Cl.
CPC ............ *G06T 15/005* (2013.01); *G06F 9/451* (2018.02)

(58) Field of Classification Search
CPC ....... G06T 15/005; G06F 9/451; G06F 9/542; G06F 1/3265; G06F 1/12; G09G 5/12; G09G 5/18; G09G 5/363; Y02D 10/00
(Continued)

(56) References Cited

U.S. PATENT DOCUMENTS 8,643,658 B2      2/2014   Kwa et al.
10,600,236 B2    3/2020   Leiby et al.
(Continued)

FOREIGN PATENT DOCUMENTS

CN        103593155  A      2/2014
CN        105094272  A      11/2015
(Continued)

OTHER PUBLICATIONS

Gong Zhipeng Method and device for managing calculation resources and electronic equipment May 8, 2020 Tencent Tech Shenzhen Co Ltd CN111111163 (A) paras. 48-61, figs. 2-3 English.*
(Continued)

*Primary Examiner* — Prabodh M Dharia
(74) *Attorney, Agent, or Firm* — Muncy, Geissler, Olds & Lowe, P.C.

(57)          ABSTRACT

High frames-per-second (FPS) displays are becoming more ubiquitous in devices such as smartphones, laptops, etc. For displaying data on displays, render sync signal and compose sync signal control timings of rendering and composing. Conventionally, there is one render sync signal and one compose sync signal for a display, and both share the same frequency as the HW sync signal of the display hardware. As the FPS of the display becomes faster and faster, i.e., as HW sync signal frequency increases, some application layers may be unable to render fast enough to keep up with the increased frequency. To address this issue, it is proposed to provide multiple render sync signals of differing frequencies and phases, and different render sync signals may be used to control the timings of rendering of different application layers. Through such managing of the application layer rendering, a better user experience can be provided.

30 Claims, 8 Drawing Sheets

(58) Field of Classification Search
USPC .......................... 345/501; 348/553; 709/224
See application file for complete search history.

(56)                   References Cited

U.S. PATENT DOCUMENTS

| | | | | |
|---|---|---|---|---|
| 2010/0188575 | A1* | 7/2010 | Salomons | H04N 5/50 |
| | | | | 348/553 |
| 2012/0110351 | A1 | 5/2012 | Raju et al. | |
| 2014/0016035 | A1 | 1/2014 | Brown et al. | |
| 2015/0244602 | A1* | 8/2015 | Hasha | H04L 67/1095 |
| | | | | 709/224 |
| 2016/0335737 | A1 | 11/2016 | Shah et al. | |
| 2017/0092340 | A1* | 3/2017 | Zheng | G06F 3/14 |
| 2017/0193971 | A1 | 7/2017 | Bi et al. | |
| 2018/0167631 | A1* | 6/2018 | Schulze | H04N 21/4302 |
| 2018/0261143 | A1 | 9/2018 | Peng et al. | |
| 2019/0116395 | A1* | 4/2019 | Kerdranvat | H04N 21/439 |
| 2020/0005736 | A1* | 1/2020 | Peng | G09G 5/377 |
| 2020/0007914 | A1 | 1/2020 | Peng et al. | |
| 2021/0248311 | A1* | 8/2021 | Helft | G06Q 10/1093 |

FOREIGN PATENT DOCUMENTS

| | | | |
|---|---|---|---|
| CN | 105867576 | A | 8/2016 |
| CN | 106464951 | A | 2/2017 |
| CN | 106791212 | A | 5/2017 |
| CN | 106796799 | A | 5/2017 |
| CN | 106933328 | A | 7/2017 |
| CN | 106933587 | A | 7/2017 |
| CN | 107102936 | A | 8/2017 |
| CN | 109272931 | A | 1/2019 |
| CN | 111111163 | A | 5/2020 |
| CN | 111324235 | A | 6/2020 |
| CN | 111399625 | A | 7/2020 |
| KR | 20190002662 | A | 1/2019 |

OTHER PUBLICATIONS

Gong Zhipeng Method and device for managing calculation resources and electronic equipment May 8, 2020 Tencent Tech Shenzhen Co Ltd CN111111163 (A) paras. 48-61, figs. 2-3 Chinese.*

Li Lun Fluency evaluation method, mobile terminal and storage medium Aug. 29, 2017 Tencent Tech Shenzhen Co Ltd CN107102936 (A) paras. 20-136 Figs. 1-7 English.*

Li Lun Fluency evaluation method, mobile terminal and storage medium Aug. 29, 2017 Tencent Tech Shenzhen Co Ltd CN107102936 (A) paras. 20-136 Figs. 1-7 Chinese.*

Supplementary European Search Report—EP20959035—Search Authority—The Hague—Jul. 5, 2024.

International Search Report and Written Opinion—PCT/CN2020/124252—ISA/EPO—Apr. 21, 2021.

Taiwan Search Report—TW110138352—TIPO—Jan. 3, 2025.

* cited by examiner

60 HZ, Status bar, Vsync-app 60B

120 HZ, game

60 HZ, wechat, Vsync-app 60A

60 HZ, Status bar

120 HZ, setting sliding information

60 HZ, Navigation bar

INTELLIGENT MANAGEMENT OF APPLICATION LAYER RENDERING

The present Application for Patent claims priority to International Patent Application No. PCT/CN2020/124252, entitled "INTELLIGENT MANAGEMENT OF APPLICATION LAYER RENDERING," filed Oct. 28, 2020, which is assigned to the assignee hereof and is expressly incorporated herein by reference in its entirety.

TECHNICAL FIELD

Various aspects described herein generally relate to display control, and more particularly, to intelligent management of application layer rendering.

BACKGROUND

Hardware display speeds of devices such as smart phones, laptops, high definition televisions, and so on are becoming faster and faster. For example, frames-per-second (FPS) capabilities of displays are increasing. While generally desirable, increased display speed also means that synchronizing the application layers that render visual information to be displayed can become a significant issue to be addressed.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary render manager of a display system is disclosed. The render manager may comprise a render sync receiver, a render sync scheduler, and a render sync responder. The render sync receiver may be configured to receive one or more render sync requests from one or more application layers. The render sync scheduler may be configured to choose, for each render sync request, a render sync signal from a plurality of render sync signals. Each render sync signal of the plurality of render sync signals may define a render sync event that periodically repeats. The render sync responder may be configured to send, for each render sync request, a render sync response to an application layer which sent that render sync request. The render sync response may comprise a render sync signal indicator configured to indicate the chosen render sync signal. For each application layer, an occurrence of the chosen render sync signal may determine a render start time defining a time in which rendering of a surface associated with that application layer is allowed to start.

An exemplary method for layer render managing is disclosed. The method may comprise receiving one or more render sync requests from one or more application layers. The method may also comprise choosing, for each render sync request, a render sync signal from a plurality of render sync signals. Each render sync signal of the plurality of render sync signals may define a render sync event that periodically repeats. The method may further comprise sending, for each render sync request, a render sync response to an application layer which sent that render sync request. The render sync response may comprise a render sync signal indicator configured to indicate the chosen render sync signal. For each application layer, an occurrence of the chosen render sync signal may determine a render start time defining a time in which rendering of a surface associated with that application layer is allowed to start.

Another exemplary render manager of a display system is disclosed. The render manager may comprise means for receiving one or more render sync requests from one or more application layers. The render manager may also comprise means for choosing, for each render sync request, a render sync signal from a plurality of render sync signals. Each render sync signal of the plurality of render sync signals may define a render sync event that periodically repeats. The render manager may further comprise means for sending, for each render sync request, a render sync response to an application layer which sent that render sync request. The render sync response may comprise a render sync signal indicator configured to indicate the chosen render sync signal. For each application layer, an occurrence of the chosen render sync signal may determine a render start time defining a time in which rendering of a surface associated with that application layer is allowed to start.

A non-transitory computer-readable medium storing computer-executable instructions for a render manager of a display system is disclosed. The executable instructions may comprise one or more instructions instructing the render manager to receive one or more render sync requests from one or more application layers. The executable instructions may also comprise one or more instructions instructing the render manager to choose, for each render sync request, a render sync signal from a plurality of render sync signals. Each render sync signal of the plurality of render sync signals may define a render sync event that periodically repeats. The executable instructions may further comprise one or more instructions instructing the render manager to send, for each render sync request, a render sync response to an application layer which sent that render sync request. The render sync response may comprise a render sync signal indicator configured to indicate the chosen render sync signal. For each application layer, an occurrence of the chosen render sync signal may determine a render start time defining a time in which rendering of a surface associated with that application layer is allowed to start.

An exemplary display system is disclosed. The display system may comprise a processor, a memory, and a render manager. The processor and the memory maybe configured to execute one or more application layers. The render manager may be configured to receive one or more render sync requests from the one or more application layers. The render manager may also be configured to choose, for each render sync request, a render sync signal from a plurality of render sync signals. Each render sync signal of the plurality of render sync signals may define a render sync event that periodically repeats. The render manager may further be configured to send, for each render sync request, a render sync response to an application layer which sent that render sync request. The render sync response may comprise a render sync signal indicator configured to indicate the chosen render sync signal. For each application layer, an occurrence of the chosen render sync signal may determine a render start time defining a time in which rendering of a surface associated with that application layer is allowed to start.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Figure 1:
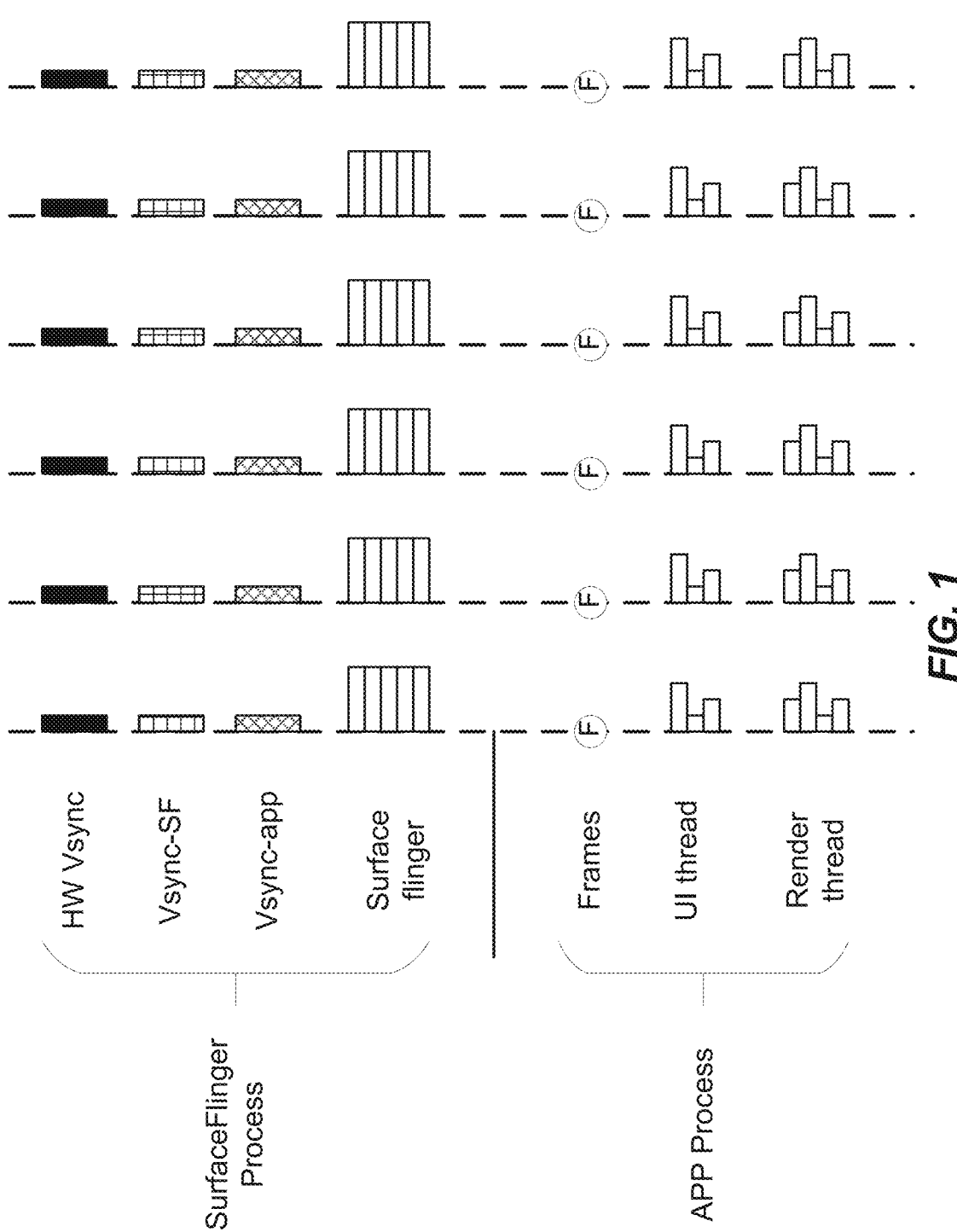
FIG. 1 illustrates conventional signals for synchronizing display frames.

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, term "display system" is not intended to be specific or otherwise limited to any particular display technology, unless otherwise noted. In general, a display system may be any device that includes one or more displays. In some instances, the displays may be built-in within the devices. Mobile phones, tablets and laptops maybe examples of devices with built-in displays. In other instances, displays may be connected to devices through interface connectors (e.g., high-definition multimedia interface (HDMI), digital visual interface (DVI), video graphics array (VGA), serial digital interface (SDI), etc.). Note that some devices can include both built-in displays as well as connected displays.

As mentioned above, hardware display speeds of devices such as smart phones, laptops, high definition televisions, and so on are becoming faster and faster. 60 Hz devices are very prevalent, but 120 Hz devices are becoming more and more common. Also, 180 Hz and even 240 Hz devices are expected to be available within a year. While increased frames-per-second (FPS) capabilities are desirable, it can also present significant challenges when it comes to synchronizing the application layers that render visual information to be displayed on displays.

Presenting visual information on a display screen generally includes the following operations—rendering, composing, and displaying. Different application layers render surfaces, the rendered surfaces are composed into a frame, and the composed frame is displayed on a display. These operations—surface rendering, composition, and displaying, are synchronized through synchronization signals Vsync-app, Vsync-sf, and HW Vsync. Vsync-app is used for synchronizing application layers rendering, Vsync-sf is used to synchronize composing, and HW Vsync controls the hardware refresh cycles.

Conventionally, there is one Vsync-app and one Vsync-sf for a display, and they share the same frequency as the HW Vsync. This is illustrated in FIG. 1. Each of the application layers start surface rendering when the Vsync-app event occurs. The frequency of the Vsync-app event occurrences is at the same frequency as the Vsync-sf event which start the composition of the rendered surfaces. Thus, there can be a spike in computational demand to render surfaces and to compose the surfaces for display at each Vsync-app event.

Figure 2:
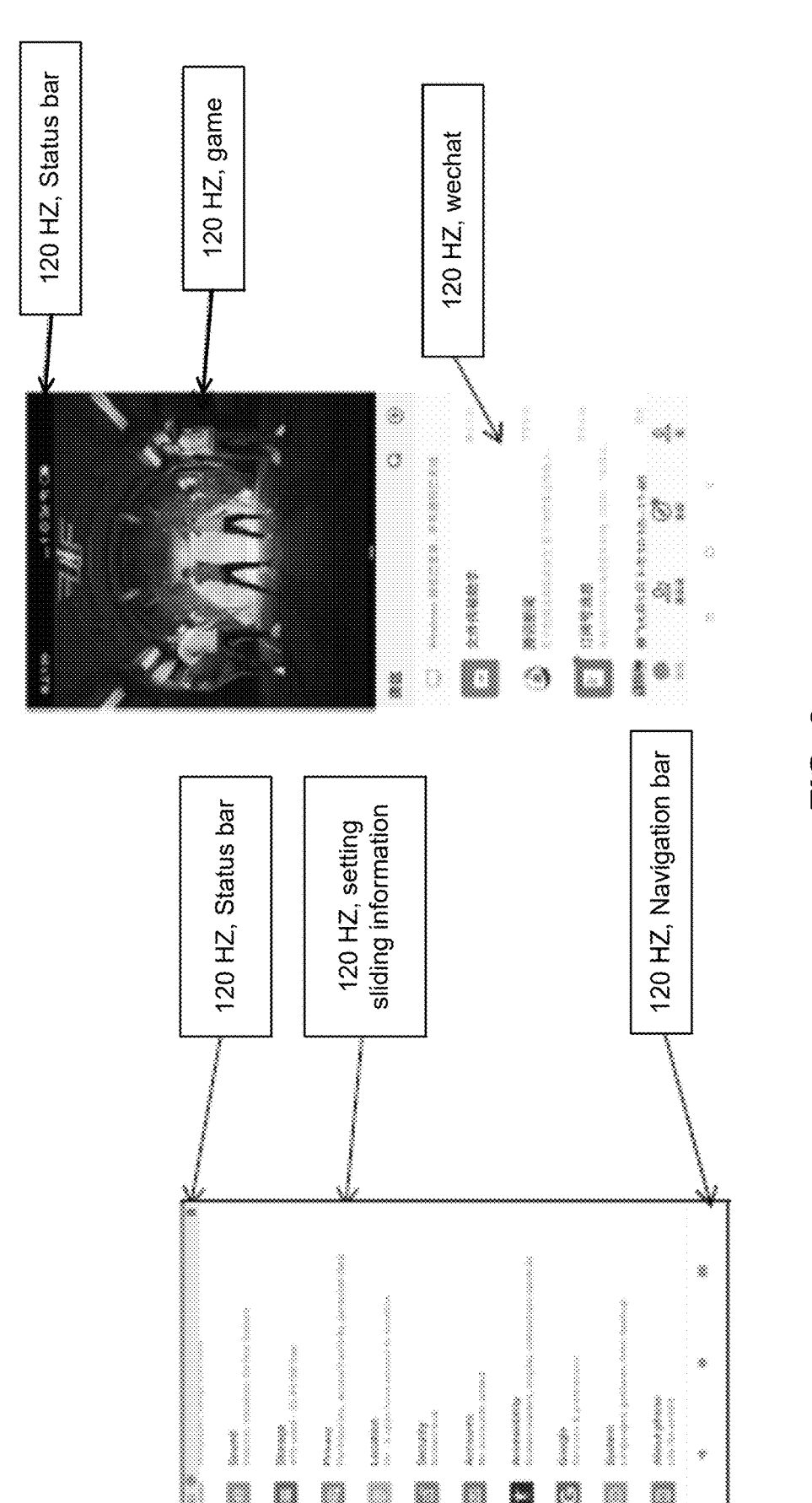
FIG. 2 illustrates an example of a conventional display of a frame.

Thus, for a 120 Hz display as an example, HW Vsync, Vsync-sf and Vsync-app all run at 120 Hz. All regular applications will synchronize to the 120 Hz Vsync-app for rendering. Exceptional applications (e.g., gaming applications) may be running in an "unmanaged" way, which may refer to application layers that may be unable render its surfaces fast enough to keep pace with the Vsync-app events or signals. For example, an application layer may take longer than 8.33 ms (1/120 Hz) to render a surface. But if all application layers are forced to render at the 120 Hz Vsync-app frequency, the resulting display can be unsmooth and generally unpleasant. FIG. 2 illustrates an example of conventional display of a single frame. Note that all surfaces of the application layers (status bars, sliding animation window, navigation bars, game window, game status bar, wechat window, etc.) are rendered at 120 Hz.

Note that not all application layers need to be rendered at 120 Hz. More generally, not all application layers need to be rendered at the FPS rate of the display hardware. That is, not all application layers need rendering at the HW Vsync frequency. For example, the navigation and status bars may be rendered at lower frequencies, e.g., 60 Hz, while others such as the sliding animation should be rendered at the high rate of 120 Hz. Some applications such as wechat may be unmanaged when forced to render at the HW Vsync rate of 120 Hz, which can result in strong jank and unsmoothness. This again indicates that forcing all application layers to render at the same highest frequency can be undesirable.

To address such issues, it is proposed to provide multiple Vsync-apps for application layer rendering. More generally, it is proposed to provide multiple render sync signals, each render sync signal being useful to synchronize rendering of surfaces by application layers. Vsync-app may be an example of a render sync signal. Each of the application layers may be matched with one of the render sync signals for rendering. In this way, application layers may be provided with different render scheduling. The multiple render sync signals, which may be dynamic, may have different frequencies, phase offsets, scheduling (e.g., start/end/sleep), and dynamic FPS switching. The multiple render sync signals may share relationships with the HW sync signal (e.g., HW Vsync) and compose sync signal (e.g., Vsync-sf).

A render manager may be provided to match the application layers with the render sync signals. The application layers may render sync requests to the render manager to request preferred render FPS lists tagged with different quality of service (QOS) categories, such exemplified in Table 1.

TABLE 1

| Layer render FPS preference list | Power-saving | Regular | Performance | Boosting |
|---|---|---|---|---|
| Layer-book-reader | 30, 60 | 60, 120 | 120 | 144 |

Figure 3:
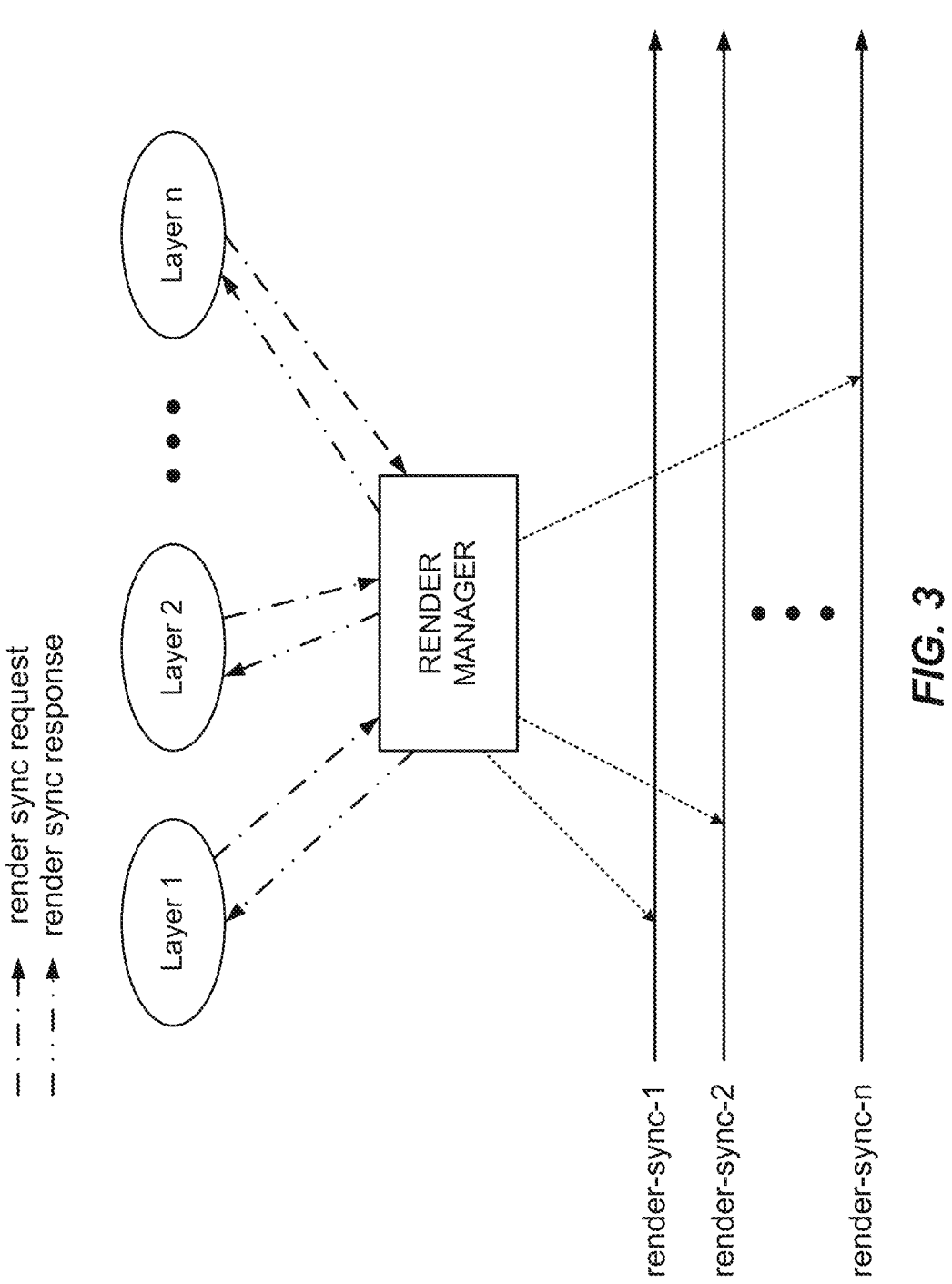
FIG. 3 illustrates communication between application layers and a render manager to schedule rendering by the application layers in accordance with one or more aspects of the disclosure.

The render manager may choose or otherwise decide the current frame's render FPS for each layer. This is illustrated in FIG. 3. As seen, multiple render sync signals—render-sync-1, render-sync-2 . . . render-sync-n—are made available for rendering synchronization. Each application layer (e.g., layer 1, layer 2, . . . layer n) may make a render sync request (dot-dash arrows) to the render manager. The render manager in turn may respond with a render sync response to each requesting application layer. Each render sync response may indicate which of the render sync signals (e.g., any of render-sync-1, render-sync-2 . . . render-sync-n) has been chosen for the corresponding requesting application layer.

Figure 4:
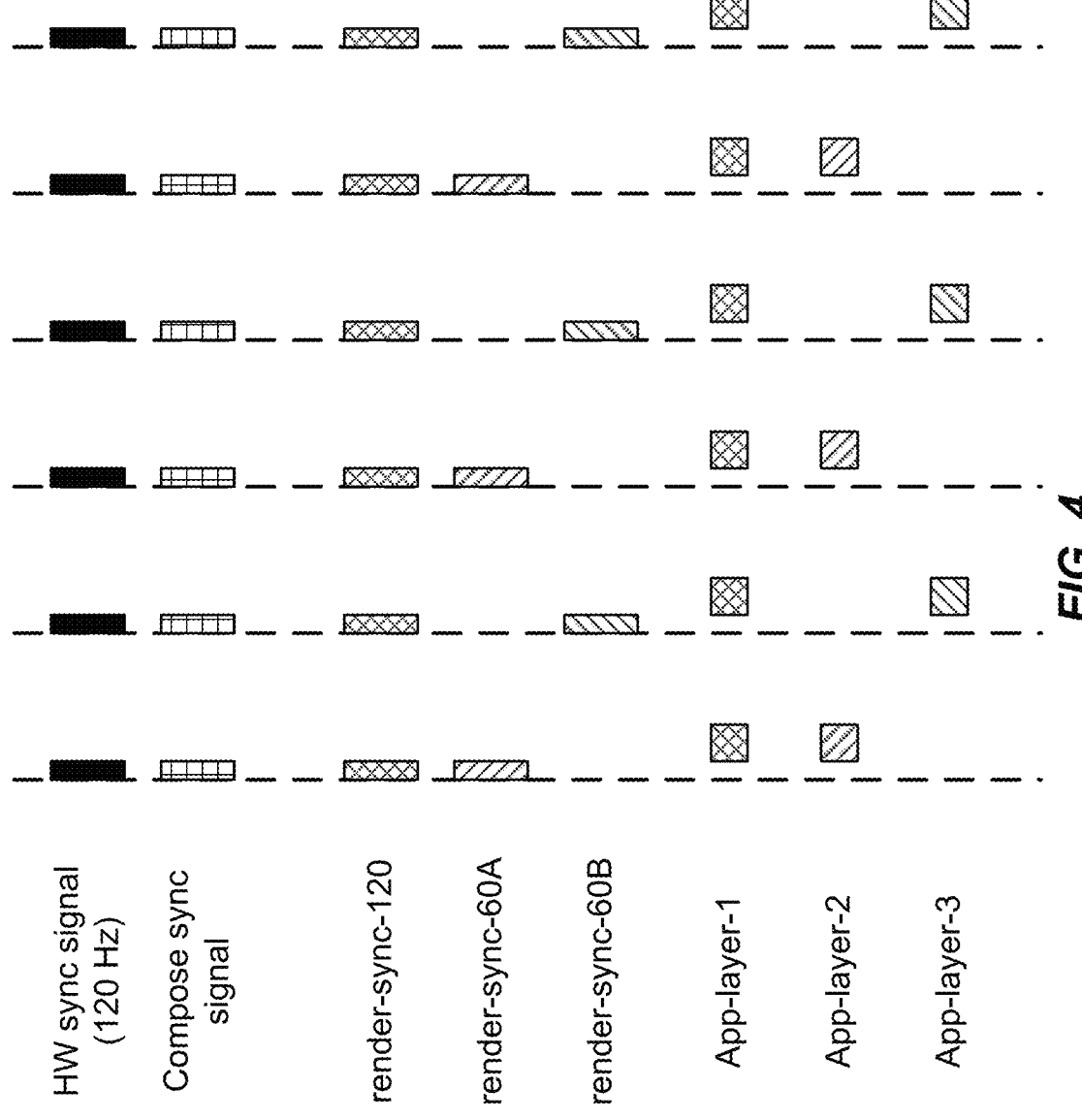
FIG. 4 illustrates an example of multiple render sync signals for application layers for rendering in accordance with one or more aspects of the disclosure.

FIG. 4 illustrates an example of runtime utilizing multiple render sync signals for application layer rendering, which is unlike the conventional scenario illustrated in FIG. 1. In FIG. 4, it is assumed that HW sync signal (the hardware display frequency) and compose sync signal (composition frequency) are both 120 Hz.

But instead of just a single render sync signal, a plurality of render sync signals may be made available. As an illustration, three render sync signals are indicated—rendersync-120 at 120 Hz, render-sync-60A at 60 Hz, and render-sync-60B also at 60 Hz, but offset in phase from render sync signal-60A. FIG. 4 also shows that different application layers may be matched with the multiple render sync signals for rendering. For example, render-sync-120 may be chosen for App-layer-1. This means that App-layer-1 may perform surface rendering at the hardware display frequency of 120 FPS. As another example, render-sync-60A may be chosen for App-layer-2 meaning that App-layer-2 may render at 60 FPS. This implies that App-layer-2 can have twice as much time duration (16.67 ms vs 8.33 ms) to render a surface when compared to App-layer-1. As a further example, render-sync-60B may be chosen for App-layer-3 meaning that App-layer-3 may also render at 60 FPS. In addition, due to the phase offset, App-layer-3 need not start its surface rendering at the same time as App-layer-2. The use of phase offsets is advantageous in that the demand for computation resources can be distributed.

While three render sync signals are illustrated in FIG. 4, this is merely an example and not a limitation. Generally, there can be two or more render sync signals in the plurality of render sync signals. Each render sync signal of the plurality of render sync signals may be different from at least one other render sync signal of the plurality of render sync signals in frequency, in phase, or in both frequency and phase.

Also, for each render sync signal, a ratio of the frequency or FPS of the HW sync signal to the frequency or FPS of that render sync signal may be a positive integer. For example, the FPS ratios of the HW sync signal and App-layer-1 in FIG. 4 is 1 (120/120). For ease of reference, such ratio may be referred to as a hardware (HW) frequency ratio. Then the HW frequency ratios of both render-sync-60A and render-sync-60B equal 2. In particular, the HW frequency ratios may be powers of 2, i.e., may be $2^n$, where n being an integer greater than or equal to zero. For example, HW frequency ratios of App-layer-1, App-layer-2, and App-layer-3 may be respectively expressed $2^0=1$, $2^1=2$, and $2^1=2$. In an aspect, HW frequency ratios may be more generalized as being a positive integer. For example, while not explicitly shown in FIG. 4, the plurality of render sync signals could include render-sync-40A, render-sync-40B, and render-sync-40C, all at 40 Hz and offset set in phase from each other by 8.33 ms.

In an aspect, HW frequency ratio of at least one render sync signal may be one, i.e., at least one render sync signal may run as fast as the hardware display rate, such as render-sync-120. In another aspect, the plurality of render sync signals may comprise at least two render sync signals whose frequencies are the same but their phases are different. To state it another way, the plurality of render sync signals may comprise first and second render sync signals with first and second frequencies and first and second phases such that the first and second frequencies are the same, but the first and second phases are different. In such instances, the first and second frequencies may be lower (i.e., lower FPS) than the HW sync signal frequency.

In FIG. 4, render-sync-60A and render-sync-60B may be examples of first and second render sync signals. Note that the lower frequency render sync signals may still nonetheless align or coincide with HW sync signal. In other words, there can still be synchronization among the render sync signals and HW sync signal. For example, note that render-sync-60A and render-sync-60B substantially align with every other HW sync signals. More generally, it may be said that each occurrence of the first render sync signal (e.g., render-sync-60A) may coincide with each first occurrence of the HW sync signal, and each occurrence of the second render sync signal (e.g., render-sync-60B) may coincide with each second occurrence of the HW sync signal.

It should be noted that a render sync signal may be matched with multiple application layers. In other words, there is no requirement for one-to-one matching between application layers and render sync signals. Also, an application layer may be matched with different render sync signals at different times, e.g., at different frames.

Figure 5:
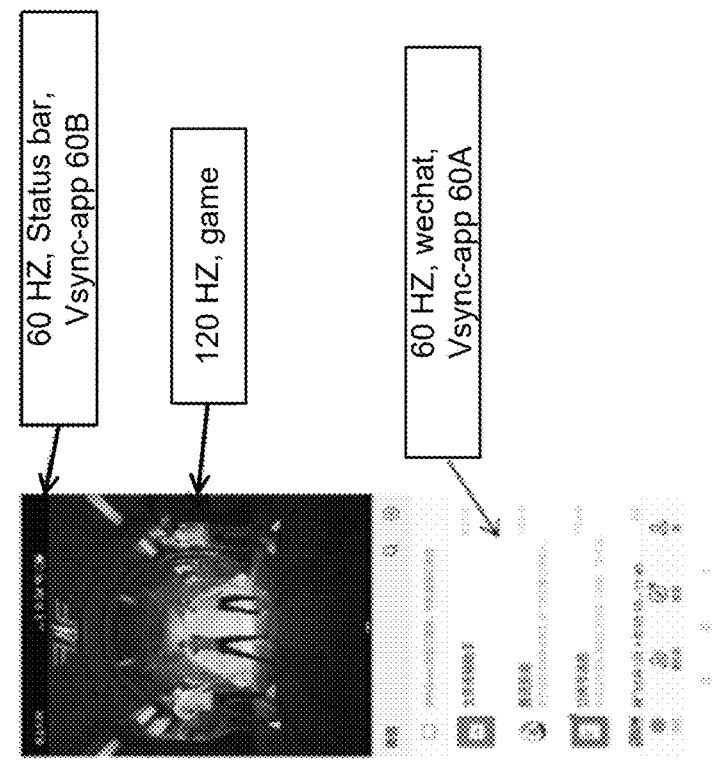
FIG. 5 illustrates an example display of a frame in accordance with one or more aspects of the disclosure.
Figure 5:
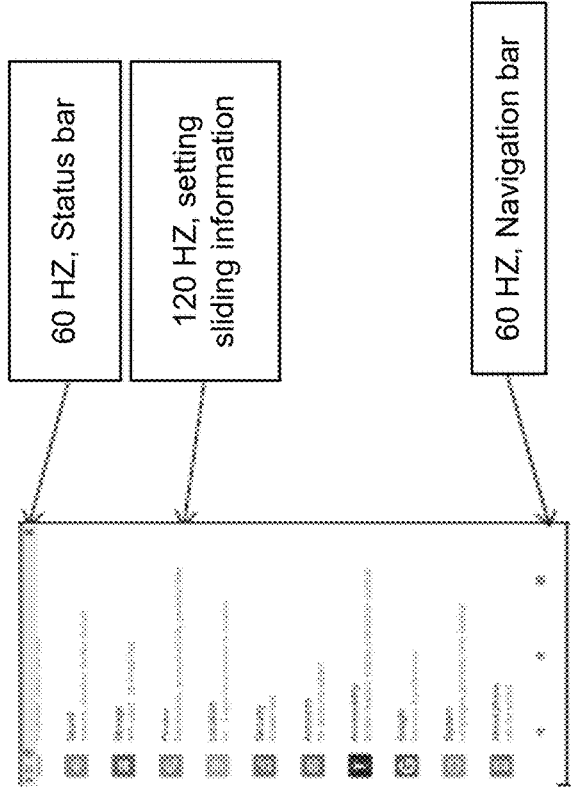

FIG. 5 illustrates an example of display of a single frame in accordance with one or more aspects. Note that the surfaces of application layers (status bars, sliding animation window, navigation bars, game window, game status bar, wechat window, etc.) are not all rendered at the same frequency. Here, the status and navigation bars may be rendered at 60 Hz instead of 120 Hz. For example, the rendering of application layers of the status and navigation bars may be synchronized with render-sync-60A or render-sync-60B. Also, the wechat application maybe now may be managed by synchronizing its rendering with 60 Hz Vsync signal (e.g., render-sync-60A or render-sync-60B) instead of 120 Hz to thereby provide the wechat application more time (e.g., 16.67 ms) to render a surface. For those application layers for which faster rendering is desirable (e.g., sliding animation window, game window), they may be synchronized with the fast render-sync-120.

Figure 6:
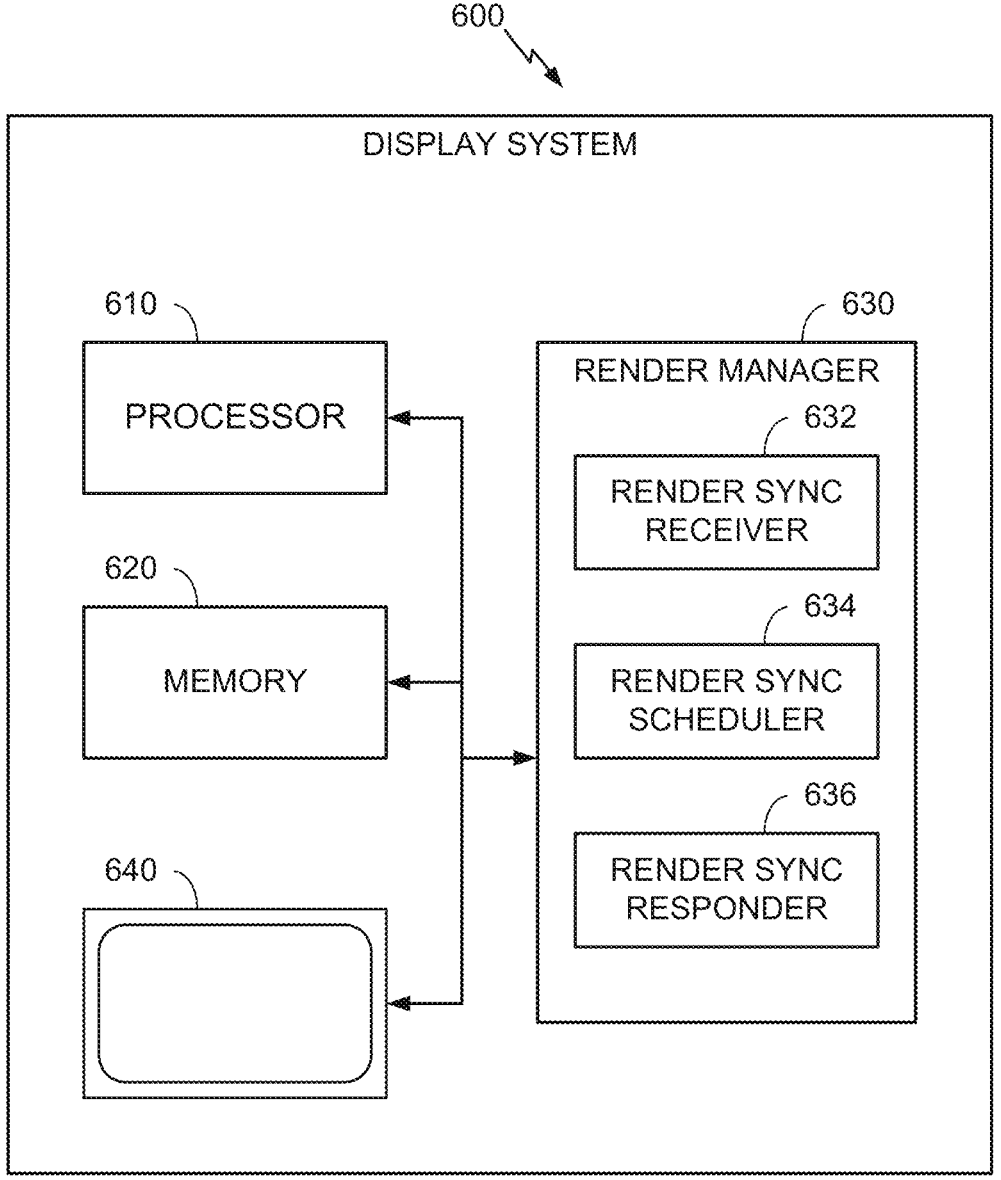
FIG. 6 illustrates a block diagram of several sample aspects of components that may be employed in an example display system in accordance with one or more aspects of the disclosure.

FIG. 6 illustrates several sample components (represented by corresponding blocks) that may be incorporated into a display system 600 to support the operations as disclosed herein. It will be appreciated that the components may be implemented in different types of apparatuses in different implementations (e.g., in an ASIC, in a System-on-Chip (SoC), etc.).

The display system 600 may include processor 610 for providing functionality relating to, for example, implementing application layers rendering surfaces of frames. In an aspect, the processor 610 may include, for example, one or more general purpose processors, multi-core processors, ASICs, digital signal processors (DSPs), field programmable gate arrays (FPGA), or other programmable logic devices or processing circuitry.

The display system 600 may also include memory 620 for maintaining information (e.g., information indicative of reserved resources, thresholds, parameters, render sync signals, application layers, and so on). In various implementations, the memory 620 may comprise a computer-readable medium storing one or more computer-executable instructions where the one or more instructions instruct the display system 600 (e.g., processor 610, render manager 630, and/or other aspects of the display system 600) to perform any of the functions described herein.

The display system 600 may further include a render manager 630 configured to manage the render scheduling of the application layers. The render manager 630 may comprise a render sync receiver 632, a render sync scheduler 634, and a render sync responder 636. Details of the render manager 630 will be provided further below.

The processor, the memory 620, and the render 630 may be configured to render and compose frames for presentation a display device 640, or simply display 640. While one display 640 is illustrated, this is merely for convenience and ease. In general, a display system 600 may include one or more displays 640. Also, each display 640 may be internal or external (e.g., connected through HDMI cable) to the display system 600.

For convenience, the display system 600 are shown in FIG. 6 as including various components that may be con-figured according to the various examples described herein. It will be appreciated, however, that the illustrated blocks may have different functionality in different designs. The components of FIG. 6 may be implemented in various ways. In some implementations, the components of FIG. 6 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 610, 620, and 630 (including blocks 632, 634, and 636) may be implemented by processor and memory component(s) of the display system 600 (e.g., by execution of appropriate code and/or by appropriate configuration of processor components).

Figure 7:
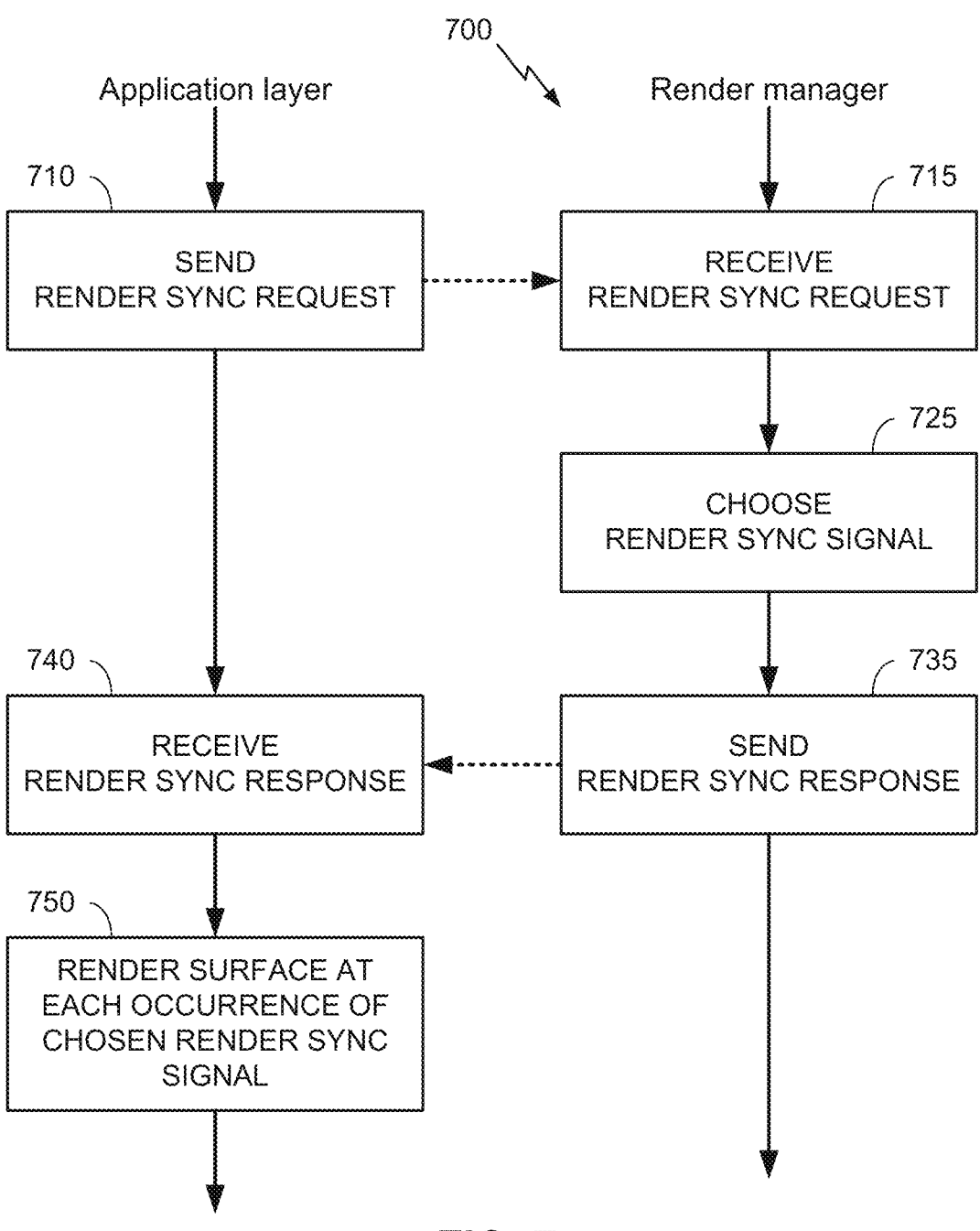
FIG. 7 illustrates a flow chart of an example method performed by a display system in accordance with one or more aspects of the disclosure.

FIG. 7 illustrates a flow chart of an exemplary method performed by a display system such as the display system 600. The memory 620 may be viewed as an example of a non-transitory computer-readable medium that stores computer-executable instructions to operate components of the display system 600 such as the render manager 630 (including render sync receiver 632, render sync scheduler 634 and render sync responder 636), the processor 610 (including one or more processors), the memory 620, and so on.

In FIG. 7, operations performed by an application layer are indicated with even numbered blocks on left side and operations performed a render manager are indicated with odd numbered blocks on the right side. While interactions between one application layer and the render manager are illustrated, it should be noted that there can be multiple application layers, and each application layer may interact as illustrated in FIG. 7. Moreover, a same application layer may interact with the render manager at different times.

In block 710, an application layer (e.g., implemented by processor 610) may send a render sync request, and in block 715, the render manager 630 (e.g., the render sync receiver 632) may receive the render sync request. Since there can be one or more application layers, the render manager 630 (e.g., the render sync receiver 632) may receive one or more render sync requests.

In block 725, the render manager 630 (e.g., the render sync scheduler 634) may choose a render sync signal from a plurality of render sync signals. For example, referring to FIG. 4, the render sync scheduler 634 may choose any one of render-sync-120, render-sync-60A, or render-sync-60B for the received render sync request. The chosen render sync signal may define a render sync event that periodically repeats. For example, again referring to FIG. 4, note that each of render-sync-120, render-sync-60A, and render-sync-60B periodically repeats.

Since there can be one or more render sync requests, the render manager 630 (e.g., the render sync scheduler 634) may choose or otherwise determine a render sync signal for each of the one or more render sync requests. It is noted that the number of application layers need not match the number of render sync signals of the plurality of render sync signals. For example, referring to FIG. 5, it is seen that there are six application layers and one of the plurality of render sync signals (one of render-sync-120, render-sync-60A, and render-sync-60B) is chosen for each application layer.

Referring back to FIG. 7, in block 735, the render manager 630 (e.g., the render sync responder 636) may send a render sync response to the application layer that sent the render sync request. In an aspect, the render sync response may comprise render sync signal indicator configured to indicate the chosen render sync signal. For example, some or all of the render sync signals may be implemented as timers (software or hardware). In such instances, the chosen timer may be indicated in the render sync response. In another example, the render sync response may include an index into a table that specifies characteristics of the chosen render sync signal (e.g., start, end, sleep, etc.). In yet another example, the render sync response may include the actual characteristics of the chosen render sync signal. Since there can be one or more sync requests, the render manager 630 (e.g., the render sync responder 636) may send one or more render sync responses.

In block 740, the application layer may receive the render sync response. In block 750, the application layer may render a surface associated with the application layer at each occurrence of the chosen render sync signal. For ease of reference, it may be said that an occurrence of the chosen render sync signal may determine a render start time, which defines a time in which rendering of a surface associated with the application layer is allowed to start. For example, referring to FIG. 4, App-layer-1 is synchronized to the HW sync signal, and thus is allowed to start rendering its associated surface every 8.33 ms ($\frac{1}{120}$ Hz). App-layer-2 is synchronized to every other HW sync signal, and thus is allowed to start rendering its associated surface every 16.67 ms ($\frac{1}{60}$ Hz). App-layer-3 is also synchronized to every other HW sync signal, and thus is allowed to start rendering its associated surface every 16.67 ms, but offset from App-layer-2.

The render sync scheduler 634 may take one or more factors into account when choosing the render sync signals for the one or more render sync requests. One factor may be the current operating mode of the display system 600. The current operating mode may be one of a plurality of operating modes. Table 1 above illustrates example of operating modes—e.g., power saving, regular, performance, boost, etc. Generally, each of the operating modes may correspond to different levels of performance and/or different levels of power consumption. As an example, if an application layer is able to render at different frequencies (e.g., at different FPS), the render sync scheduler 634 may choose a lower frequency render sync signal when the current operating mode of the display system 600 is power saving.

Another factor may be to distribute resources demand over time, i.e., reduce resource demand spikes. For example, referring again to FIG. 4, note that each occurrence of App-layer 3 is offset from App-layer-2. This implies that surface rendering start times of App-layer-2 and App-layer-3 are different. This can be advantageous in that demand for resources of the display system 600 (e.g., computational demand) can be distributed more evenly instead of spiking at each HW sync signal event. In an aspect, when the resources demand is taken into account, render sync signals may be chosen such that render start times of two or more application layers are different.

In an aspect, the render sync request from an application layer may include a MinRenderCycle indicating a minimum time duration in between two render start times of the surface associated with the application layer. For example, App-layer-2 in FIG. 4 may indicate its MinRenderCycle as 10 ms. In this instance, render-sync-120 would not be chosen since the duration between consecutive render sync signal-120 events (8.33 ms) is shorter than the MinRenderCycle duration. However, either render-sync-60A or render-sync-60B may be chosen.

Note that an application layer may send render sync requests at different times. However, it is NOT required that the same render sync signal be chosen for the application layer. That is, the choice of the render sync signal can be dynamic. For example, an application layer may be associated with a surface of a scrollable window. If a user interface (UI) does not detect a command from a user to scroll the window, the window may be fairly static, and thus, a lower frequency (lower FPS) render sync signal may be chosen. However, if the UE detects a scrolling action from the user, then a higher frequency render sync signal may be chosen to enable smoother scrolling.

Broadly, when the render sync receiver 630 receives first and second render sync requests at first and second times from a same application layer, the render sync scheduler 634 may be configured to choose first and second render sync signals different from each other. In an aspect, the application layer may indicate different MinRenderCycles in different render sync requests to indicate its preference for higher/lower frequency render sync signals.

Figure 8:
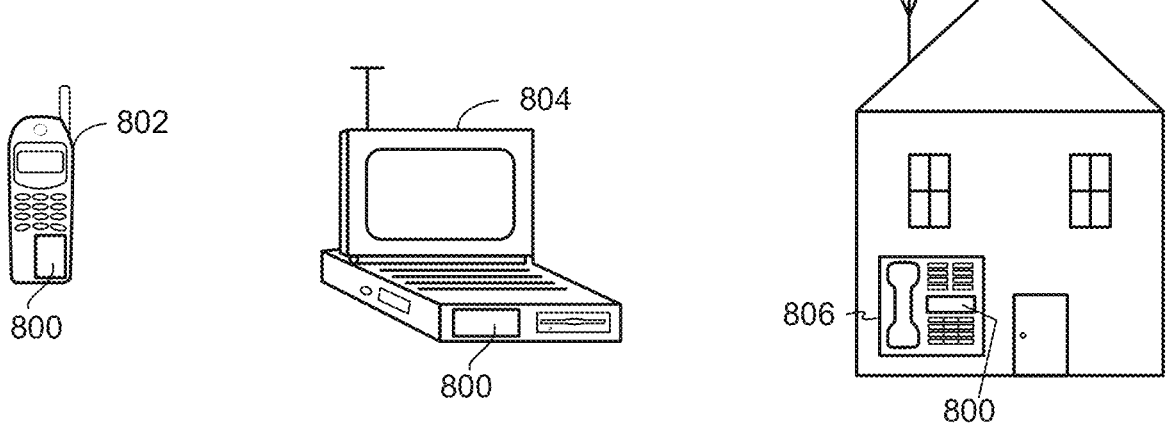
FIG. 8 illustrates examples of devices with a display system integrated therein.

FIG. 8 illustrates various electronic devices that may be integrated with the aforementioned display system 600 illustrated in FIG. 6. For example, a mobile phone device 802, a laptop computer device 804, a terminal device 806 as well as security devices that incorporate the oscillator detector 135/the detection system 130 as described herein may include an apparatus 800. The apparatus 800 may be a standalone device, such as a sensor, a fixed sensor, an IoT (Internet of Things) device, etc. The devices 802, 804, 806 illustrated in FIG. 8 are merely exemplary. Other electronic devices may also feature the apparatus 800 including, but not limited to, a group of devices (e.g., electronic devices) that includes security devices, mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any combination thereof.

The following provides an overview of examples of the present disclosure:

Example 1: A method of a render manager of a display system, comprising: receiving one or more render sync requests from one or more application layers; choosing, for each render sync request, a render sync signal from a plurality of render sync signals, each render sync signal of the plurality of render sync signals defining a render sync event that periodically repeats; and sending, for each render sync request, a render sync response to an application layer which sent that render sync request, the render sync response comprising a render sync signal indicator configured to indicate the chosen render sync signal, wherein for each application layer, an occurrence of the chosen render sync signal determines a render start time defining a time in which rendering of a surface associated with that application layer is allowed to start.

Example 2: The method of example 1, wherein each render sync signal of the plurality of render sync signals is different from at least one other render sync signal of the plurality of render sync signals in frequency, in phase, or in both.

Example 3: The method of any of examples 1-2, wherein for each render sync signal of the plurality of render sync signals, a hardware (HW) frequency ratio of that render sync signal is a positive integer, the HW frequency ratio of a render sync signal being a ratio of a frequency of a HW sync signal of a display of the display system to a frequency of the render sync signal.

Example 4: The method of example 3, wherein for each render sync signal of the plurality of render sync signals, the HW frequency ratio of that render sync signal is $2^n$, n being an integer greater than or equal to zero.

Example 5: The method of any of examples 3-4, wherein the HW frequency ratio of at least one render sync signal of the plurality of render sync signals is one.

Example 6: The method of any of examples 1-5, wherein the plurality of render sync signals comprises at least first and second render sync signals with first and second frequencies and with first and second phases in which the first and second frequencies are same but first and second phases are different.

Example 7: The method of example 6, wherein the first and second frequencies are lower than the frequency of the HW sync signal.

Example 8: The method of any of examples 6-7, wherein each occurrence of the first render sync signal coincides with each first occurrence of the HW sync signal, and wherein each occurrence of the second render sync signal coincides with each second occurrence of the HW sync signal.

Example 9: The method of any of examples 1-8, wherein the render sync scheduler is configured to choose the render sync signal for at least one render sync request based on a current operating mode of the display system.

Example 10: The method of example 9, wherein the current operating mode of the display system is one of a plurality of operating modes, each operating mode of the plurality of operating modes corresponding to different levels of performance and/or different levels of power consumption.

Example 11: The method of any of examples 1-10, wherein the render sync scheduler is configured to choose the render sync signals such that the render start times of two or more application layers are different.

Example 12: The method of any of examples 1-11, wherein when the render sync receiver receives first and second render sync requests at first and second times from a same application layer, the render sync scheduler is configured to choose first and second render sync signals different from each other.

Example 13: The method of any of examples 1-12, wherein at least one render sync request from corresponding at least one application layer includes a MinRenderCycle indicating a minimum time duration in between two render start times of the surface associated with the corresponding at least one application layer, and wherein the render sync scheduler is configured to choose the render sync signal for the at least one render sync request based on the MinRenderCycle.

Example 14: A render manager of a display system comprising at least one means for performing a method of any of examples 1-13.

Example 15: A display system comprising a processor, memory coupled with the processor, the processor and memory configured perform a method of any of examples 1-13.

Example 15: A non-transitory computer-readable medium storing code for display system comprising a processor, memory coupled with the processor, and instructions stored in the memory and executable by the processor to cause the display system to perform a method of any of examples 1-13.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and micro-wave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data mag-netically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is con-templated unless limitation to the singular is explicitly stated.

What is claimed is:

1. A render manager of a display system, comprising:
a render sync receiver configured to receive one or more render sync requests from one or more application layers;
a render sync scheduler configured to choose, for each render sync request, a render sync signal from a plu-rality of render sync signals, each render sync signal of the plurality of render sync signals defining a render sync event that periodically repeats; and
a render sync responder configured to send, for each render sync request, a render sync response to an application layer which sent that render sync request, the render sync response comprising a render sync signal indicator configured to indicate the chosen ren-der sync signal,
wherein for each application layer, an occurrence of the chosen render sync signal determines a render start time defining a time in which rendering of a surface associated with that application layer is allowed to start, and
wherein the one or more render synch requests are sepa-rate from renderings performed by the one or more application layers.

2. The render manager of claim 1, wherein each render sync signal of the plurality of render sync signals is different from at least one other render sync signal of the plurality of render sync signals in frequency, in phase, or in both.

3. The render manager of claim 1, wherein for each render sync signal of the plurality of render sync signals, a hard-ware (HW) frequency ratio of that render sync signal is a positive integer, the HW frequency ratio of a render sync signal being a ratio of a frequency of a HW sync signal of a display of the display system to a frequency of the render sync signal.

4. The render manager of claim 3, wherein for each render sync signal of the plurality of render sync signals, the HW frequency ratio of that render sync signal is $2^n$, n being an integer greater than or equal to zero.

5. The render manager of claim 3, wherein the HW frequency ratio of at least one render sync signal of the plurality of render sync signals is one.

6. The render manager of claim 1, wherein the plurality of render sync signals comprises at least first and second render sync signals with first and second frequencies and with first and second phases in which the first and second frequencies are same but first and second phases are different.

7. The render manager of claim 6, wherein the first and second frequencies are lower than the frequency of the HW sync signal.

8. The render manager of claim 6,
wherein each occurrence of the first render sync signal coincides with each first occurrence of the HW sync signal, and
wherein each occurrence of the second render sync signal coincides with each second occurrence of the HW sync signal.

9. The render manager of claim 1, wherein the render sync scheduler is configured to choose the render sync signal for at least one render sync request based on a current operating mode of the display system.

10. The render manager of claim 9, wherein the current operating mode of the display system is one of a plurality of operating modes, each operating mode of the plurality of operating modes corresponding to different levels of perfor-mance and/or different levels of power consumption.

11. The render manager of claim 1, wherein the render sync scheduler is configured to choose the render sync signals such that the render start times of two or more application layers are different.

12. The render manager of claim 1, wherein when the render sync receiver receives first and second render sync requests at first and second times from a same application layer, the render sync scheduler is configured to choose first and second render sync signals different from each other.

13. The render manager of claim 1,
wherein at least one render sync request from correspond-ing at least one application layer includes a MinRen-derCycle indicating a minimum time duration in between two render start times of the surface associated with the corresponding at least one application layer, and
wherein the render sync scheduler is configured to choose the render sync signal for the at least one render sync request based on the MinRenderCycle.

14. A method of a render manager of a display system, the method comprising:
receiving one or more render sync requests from one or more application layers;
choosing, for each render sync request, a render sync signal from a plurality of render sync signals, each render sync signal of the plurality of render sync signals defining a render sync event that periodically repeats; and
sending, for each render sync request, a render sync response to an application layer which sent that render sync request, the render sync response comprising a render sync signal indicator configured to indicate the chosen render sync signal,
wherein for each application layer, an occurrence of the chosen render sync signal determines a render start time defining a time in which rendering of a surface associated with that application layer is allowed to start, and wherein the one or more render synch requests are separate from renderings performed by the one or more application layers.

15. The method of claim 14, wherein each render sync signal of the plurality of render sync signals is different from at least one other render sync signal of the plurality of render sync signals in frequency, in phase, or in both.

16. The method of claim 14, wherein for each render sync signal of the plurality of render sync signals, a hardware (HW) frequency ratio of that render sync signal is a positive integer, the HW frequency ratio of a render sync signal being a ratio of a frequency of a HW sync signal of a display of the display system to a frequency of the render sync signal.

17. The method of claim 16, wherein for each render sync signal of the plurality of render sync signals, the HW frequency ratio of that render sync signal is 2", n being an integer greater than or equal to zero.

18. The method of claim 16, wherein the HW frequency ratio of at least one render sync signal of the plurality of render sync signals is one.

19. The method of claim 14, wherein the plurality of render sync signals comprises at least first and second render sync signals with first and second frequencies and with first and second phases in which the first and second frequencies are same but first and second phases are different.

20. The method of claim 19, wherein the first and second frequencies are lower than the frequency of the HW sync signal.

21. The method of claim 19,
wherein each occurrence of the first render sync signal coincides with each first occurrence of the HW sync signal, and
wherein each occurrence of the second render sync signal coincides with each second occurrence of the HW sync signal.

22. The method of claim 14, wherein the render sync scheduler is configured to choose the render sync signal for at least one render sync request based on a current operating mode of the display system.

23. The method of claim 22, wherein the current operating mode of the display system is one of a plurality of operating modes, each operating mode of the plurality of operating modes corresponding to different levels of performance and/or different levels of power consumption.

24. The method of claim 14, wherein the render sync signals are chosen such that the render start times of two or more application layers are different.

25. The method of claim 14, wherein when first and second render sync requests are received at first and second times from a same application layer, first and second render sync signals different from each other are chosen.

26. The method of claim 14,
wherein at least one render sync request from corresponding at least one application layer includes a MinRenderCycle indicating a minimum time duration in between two render start times of the surface associated with the corresponding at least one application layer, and
wherein choosing the render sync signal comprises choosing the render sync signal for the at least one render sync request based on the MinRenderCycle.

27. A render manager of a display system, comprising:
means for receiving one or more render sync requests from one or more application layers;

means for choosing, for each render sync request, a render sync signal from a plurality of render sync signals, each render sync signal of the plurality of render sync signals defining a render sync event that periodically repeats; and
means for sending, for each render sync request, a render sync response to an application layer which sent that render sync request, the render sync response comprising a render sync signal indicator configured to indicate the chosen render sync signal,
wherein for each application layer, an occurrence of the chosen render sync signal determines a render start time defining a time in which rendering of a surface associated with that application layer is allowed to start, and
wherein the one or more render synch requests are separate from renderings performed by the one or more application layers.

28. The render manager of claim 27, wherein each render sync signal of the plurality of render sync signals is different from at least one other render sync signal of the plurality of render sync signals in frequency, in phase, or in both.

29. The render manager of claim 27, wherein the means for choosing is configured to choose the render sync signal based on
a current operating mode of the display system, each operating mode of the plurality of operating modes corresponding to different levels of performance and/or different levels of power consumption,
a MinRenderCycle included in the render sync request, the MinRenderCycle indicating a minimum time duration in between two render start times of the surface associated with the corresponding application layer,
number of application layers matched to each of the plurality of render sync signals, or
any combination thereof.

30. A non-transitory computer-readable medium storing computer-executable instructions for a render manager of a display system, the computer-executable instructions comprising:
one or more instructions instructing the render manager to receive one or more render sync requests from one or more application layers;
one or more instructions instructing the render manager to choose, for each render sync request, a render sync signal from a plurality of render sync signals, each render sync signal of the plurality of render sync signals defining a render sync event that periodically repeats; and
one or more instructions instructing the render manager to send, for each render sync request, a render sync response to an application layer which sent that render sync request, the render sync response comprising a render sync signal indicator configured to indicate the chosen render sync signal,
wherein for each application layer, an occurrence of the chosen render sync signal determines a render start time defining a time in which rendering of a surface associated with that application layer is allowed to start, and
wherein the one or more render synch requests are separate from renderings performed by the one or more application layers.

* * * * *